US007853343B2

(12) United States Patent
Omata

(10) Patent No.: US 7,853,343 B2
(45) Date of Patent: Dec. 14, 2010

(54) ACOUSTIC DEVICE AND REPRODUCTION MODE SETTING METHOD

(75) Inventor: Hirohito Omata, Hachiouji (JP)

(73) Assignee: Kabushiki Kaisha Kenwood, Hachiouji-shi, Tokyo (JP)

( * ) Notice: Subject to any disclaimer, the term of this patent is extended or adjusted under 35 U.S.C. 154(b) by 972 days.

(21) Appl. No.: 11/628,737

(22) PCT Filed: Apr. 27, 2005

(86) PCT No.: PCT/JP2005/008451

§ 371 (c)(1),
(2), (4) Date: Dec. 7, 2006

(87) PCT Pub. No.: WO2006/003754

PCT Pub. Date: Jan. 12, 2006

(65) Prior Publication Data

US 2008/0049944 A1 Feb. 28, 2008

(30) Foreign Application Priority Data

Jun. 30, 2004 (JP) ............................ 2004-193943

(51) Int. Cl.
*G06F 17/00* (2006.01)

(52) U.S. Cl. ........................................................ 700/94

(58) Field of Classification Search ................... 700/94; 704/500–504
See application file for complete search history.

(56) References Cited

U.S. PATENT DOCUMENTS

2002/0038158 A1 * 3/2002 Hashimoto et al. ............ 700/94

FOREIGN PATENT DOCUMENTS

| | | |
|---|---|---|
| EP | 0 999 550 | 5/2000 |
| JP | 07-162384 | 6/1995 |
| JP | 10-174018 | 6/1998 |
| JP | 2000-149454 | 5/2000 |
| JP | 2001-036999 | 2/2001 |
| JP | 2002-057959 | 2/2002 |
| JP | 2003-263198 | 9/2003 |

OTHER PUBLICATIONS

International Preliminary Examination Report dated Jan. 18, 2007 for Application No. PCT/JP2005/008451.
Examiner's Office Letter (Application No. 2004-193943) Dated Jun. 17, 2008.
European Search Report (Application No. 05738544.5) dated Aug. 4, 2010.
International Search Report for PCT/JP2005/008451.

* cited by examiner

*Primary Examiner*—Andrew C Flanders
(74) *Attorney, Agent, or Firm*—Eric J. Robinson; Robinson Intellectual Property Law Office, P.C.

(57) ABSTRACT

The process control unit (11) of a microcomputer (1) controls a decoder (21) to decode an input signal, and acquires the voice format information of an input signal. The process control unit (11) calls the processing method of matrix processing stored in a storage unit (12) based on the acquired voice format information. The process control unit (11) further acquires encode channel-related information from an input signal. When the encode channel is 2-channel, the process control unit (11) controls a surround processor (22) to perform matrix processing on an input signal and output a multi-channel-based voice. An acoustic device capable of setting a reproduction mode according to an input signal is realized.

5 Claims, 5 Drawing Sheets

FIG. 3

| AUDIO FORMAT | ENCODE ch | MATRIX PROCESSING |
|---|---|---|
| AC-3 | 2ch | PRO LOGIC |
| | MULTI CH | ——— |
| DTS | 2ch | NEO: 6 |
| | MULTI CH | ——— |
| AAC | 2ch | PRO LOGIC |
| | MULTI CH | ——— |
| ⋮ | ⋮ | ⋮ |

ACOUSTIC DEVICE AND REPRODUCTION MODE SETTING METHOD

TECHNICAL FIELD

The present invention relates to an acoustic device and a reproduction mode setting method.

BACKGROUND ART

In recent years, in acoustic apparatuses such as an audio device, audio reproduction and outputting using a surround function are generally performed. The surround function is a function of creating a stereoscopic sound field by what is called a multichannel to implement sound with realistic sensation. As such surround function system, there are various surround modes; 5.1-ch surround systems using an audio compression format such as AC-3 (trademark), DTS (trademark) or AAC (trademark), 5.1-ch surround systems such as Dolby Pro Logic (trademark), and 6.1-ch surround system such as NEO:6 (trademark) are presently in widespread use. In order to handle such surround function having a different mode, there has been devised an audio reproduction system capable of performing reproduction mode switching for each audio format (for example, Japanese Patent No. 3491417, pp. 4-5, FIG. 1).

Also, with recent advancement of digital HiVision in TV broadcast, not only audio software reproduction apparatuses such as CD (Compact Disc) or DVD (Digital Versatile Disc) but also TV receivers or the like often have mounted therein the surround function. As TV broadcast, there are two main types of broadcast modes; two-channel and multi-channel. When the original broadcast is multi-channel, it can be directly reproduced by the surround mode. However, in reproducing two-channel broadcast sound by the surround mode, a multi-channel processing (matrix processing) for creating multi-channel from two-channel must be applied to the audio signal.

The above described matrix processing is effective when the number of channels of input audio signal is smaller than the desired number of channels of audio output, but unnecessary when the number of channels of input audio signal is equal or smaller than the desired number of channels of audio output. Accordingly, in such case, the above matrix processing is prohibited. Thus, when the matrix processing is applied to digital broadcast sound, before applying the processing, a selection of whether or not to apply the matrix processing must be made according to whether the audio signal is two-channel or multi-channel. On the contrary, there is a case where it is desired to apply a down-mix processing to multi-channel audio signal to obtain a two-channel audio signal. In this case, also, before applying the processing, a selection of whether or not to apply the down-mix processing must be made according to whether the audio signal is two-channel or multi-channel.

This setting of surround mode is usually performed by the user itself watching the TV broadcast; when the user continues to watch programs having the same number of audio channels, the operation does not create so much burden for the user. However, for example, when the user alternately selects two-channel broadcast and multi-channel broadcast to watch the broadcast, the surround mode setting constitutes a significantly complicated operation. More specifically, in a case where the user watches a two-channel program and then, once selects a multi-channel program and thereafter, begins to watch a two-channel program again, the matrix processing is reset when the multi-channel is selected. Consequently, when a two-channel is selected again, the setting of surround mode has been reset, so the user watches the two-channel program as it is.

As a result, whenever the user performs switching between a plurality of channels, surround mode (reproduction mode) setting must be repeated, constituting a significantly burdensome operation. Needless to say, as for the above described down-mix processing, the same problem arises.

Also, when the audio signal is a compressed audio signal, it is occasionally desired to perform surround mode (reproduction mode) setting with respect to each of the different audio compression (AC-3 (trademark), DTS (trademark) and the like) formats In this case, also, similarly to the above described case, the user must repeat the setting according to an audio compression format of input audio signal, this constituting a significantly burdensome operation.

To address the above circumstances, the present invention has been achieved, and an object thereof is to implement an acoustic device capable of properly setting a reproduction mode.

DISCLOSURE OF THE INVENTION

To achieve the above object, according to a first aspect of the present invention, there is provided an acoustic device receiving an input audio signal containing information on audio format and setting a reproduction mode for performing audio reproduction based on the audio signal, the device characterized by including:

storage means for storing for each audio format, reproduction mode setting information for a plurality of audio formats;

audio information acquiring means for acquiring information on audio format of the audio signal from the audio signal received;

determination means for reading according to the information on audio format of the audio signal acquired by the audio information acquiring means, the reproduction mode setting information for the corresponding audio format from the storage means and thereby determining a reproduction mode of the audio signal; and reproduction mode setting means for setting according to the determination a reproduction mode used to perform audio reproduction based on the audio signal.

Preferably, the audio signal is a compressed digital audio signal;

the audio information acquiring means is decode means for decoding the digital audio signal and acquiring information on audio format of the digital audio signal; and the reproduction mode setting means is multi-channel processing means for decoding the digital audio signal and setting a reproduction mode of the digital audio signal.

Preferably, the audio signal contains information on audio channel format as the information on audio format;

the determination means determines an audio channel format of the input audio signal; and the reproduction mode setting means sets according to the information on audio channel format of the input audio signal determined by the determination means, a multi-channel processing for converting the input audio signal into multi-channel.

Preferably, the audio signal contains information on compression format of the audio signal as the information on audio format;

the storage means stores for each compression format, reproduction mode setting information for a plurality of compression formats, the setting information including information on type of multi-channel processing;

the determination means reads from the storage means, information on type of multi-channel processing among the reproduction mode setting information for the corresponding compression format according to the information on compression format among the information on audio format acquired by the audio acquiring means, and thereby determining a type of multi-channel processing corresponding to the audio signal; and the reproduction mode setting means applies a multi-channel processing to the audio signal according to the determination to convert the audio signal into multi-channel.

To achieve the above object, according to a second aspect of the present invention, there is provided a reproduction mode setting method for receiving an input audio signal containing information on audio format and setting a reproduction mode for performing audio reproduction based on the audio signal, the method characterized by including the steps of:

preliminarily storing for each audio format, reproduction mode setting information for a plurality of audio formats, and acquiring information on audio format of the audio signal from the audio signal received;

reading according to the acquired information on audio format of the audio signal, the stored reproduction mode setting information for the corresponding audio format and thereby determining a reproduction mode of the audio signal; and setting according to the determination, a reproduction mode used to perform audio reproduction based on the audio signal.

According to the present invention, an acoustic device and reproduction mode setting method capable of performing reproduction mode switching according to an input signal can be implemented.

BRIEF DESCRIPTION OF THE DRAWINGS

FIG. 3 is a view illustrating an example of information stored in a storage unit of a microcomputer in the acoustic device of FIG. 1;

DESCRIPTION OF SYMBOLS

Figure 1:
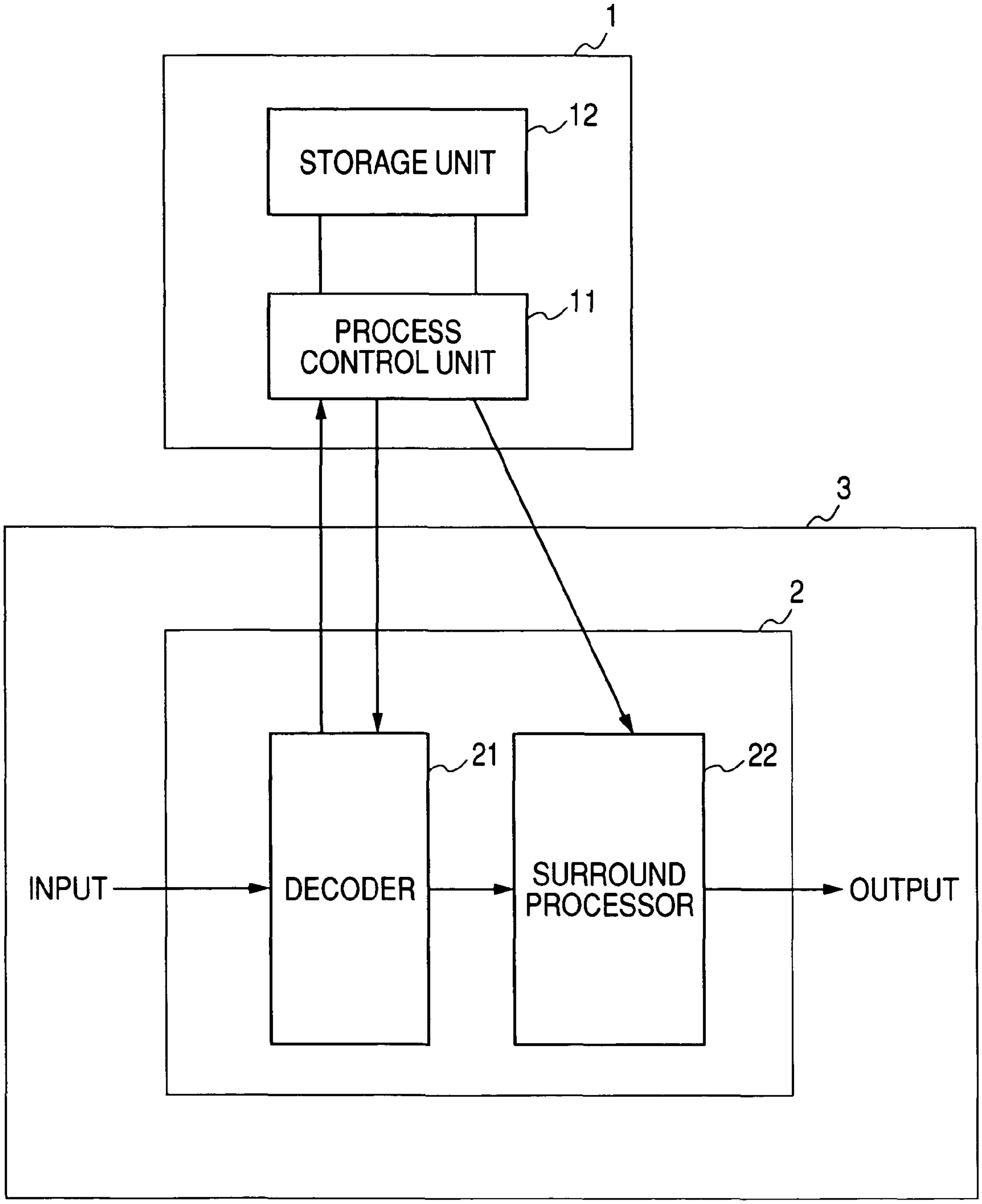
FIG. 1 is a configuration diagram of an acoustic device according to an embodiment of the present invention.

1 microcomputer
2 decode processing unit
3 signal processing device
11 process control unit
12 storage unit
21 decoder
22 surround processor

BEST MODE FOR CARRYING OUT THE INVENTION

An acoustic device according to the present embodiment is one mounted in an audio reproduction apparatus such as a TV receiver and as illustrated in FIG. 1, includes a microcomputer 1 and a decode processing unit 2. The decode processing unit 2 is constructed in the interior of a signal processing device 3 such as DSP (Digital Signal Processor), applying a decode processing (expanding processing) to a compressed digital audio signal received from the outside and output the signal. Of course, the acoustic device may be independently arranged. In this case, a configuration is used in which an audio signal is received from a TV receiver or a reproduction device (an optical disc player or the like) such as an audio apparatus.

Figure 2:
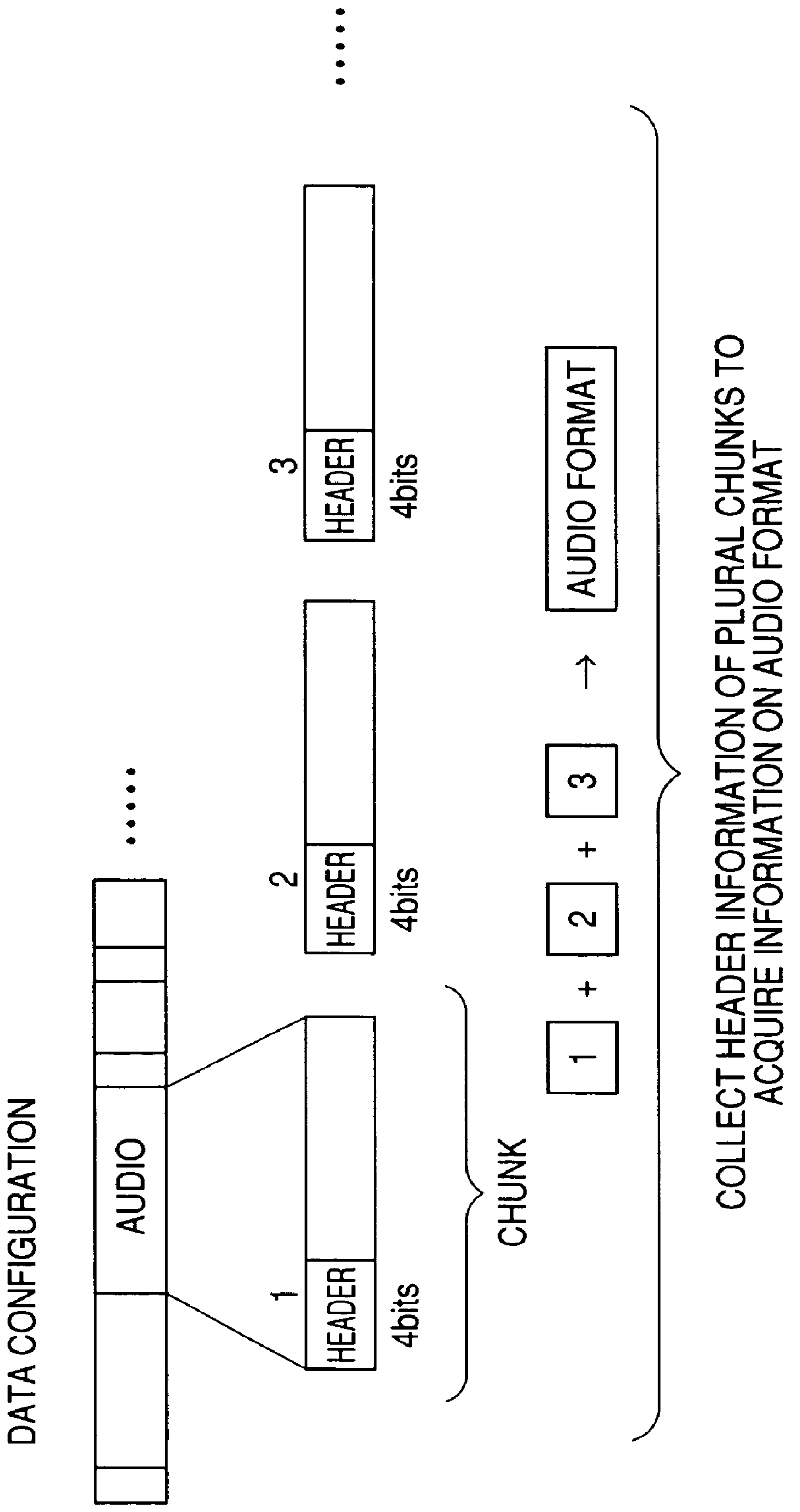
FIG. 2 is a view for explaining how to acquire information on audio format contained in a data configuration of input signal.

Here, the digital audio signal has a data configuration as illustrated in FIG. 2. More specifically, in a predetermined chunk (data group of a predetermined length) in the data, there is stored information on audio. When a reproduction mode setting processing described later is performed, header information (4 bits) in a plurality of chunks is collected to constitute data, whereby a process control unit 11 of the microcomputer 1 acquires information on audio format (information on whether it is AC-3 (trademark), DTS (trademark) or AAC (trademark)) contained in the digital audio signal and information on how many channels have been used to encode the audio.

The microcomputer 1 includes a process control unit 11 for performing process control of this device and a storage unit 12.

The process control unit 11 is constituted of a CPU (Central Processing Unit) and the like, and controls the operation of the whole microcomputer 1 and at the same time, performs various processings for setting a reproduction mode. To be more in detail, a decoder 21 of the decode processing unit 2 is controlled to decode a digital audio signal and then information on audio format is acquired from the data configuration of the digital audio signal.

Also, the process control unit 11 controls a surround processor 22 to apply a matrix processing (multi-channel processing) to the input signal. Here, "matrix processing" means a processing of applying a matrix processing (conversion into multi-channel) to encoded two-channel audio data.

The storage unit 12 is constituted of a predetermined storage device such as a hard disk device or a semiconductor memory, and stores various data and programs. According to the present embodiment, in the storage unit 12, the setting of encode channel and matrix processing associated therewith for each audio format is stored, for example in a table as illustrated in FIG. 3; In response to access from the process control unit 11, these pieces of information are supplied to the process control unit 11. The setting of information stored in the table can be changed by the user; when supplied with information from an input receiving unit arranged in another section of the TV receiver (or audio apparatus), for receiving an input for performing a predetermined audio setting, the process control unit 11 updates the information stored in the table accordingly.

There are also systems of converting an audio signal, for example from two-channel to three-channel or from 5.1-channel to 7.1-channel, other than the relationship illustrated in FIG. 3. More specifically, a matrix processing (processing of conversion into multi-channel) is applied to audio signals SL and SR among audio signals of L, C, R, SL, SR and W to obtain a 7.1-channel audio signal. The present invention will describe as conversion into multi-channel, any processing of obtaining an output audio signal having a larger number of channels than that of the input audio signal, including the above described processings.

The decode processing unit 2 includes the decoder 21 and surround processor 22.

The decoder 21 decodes (expanding processing) a digital audio signal supplied from the outside to the signal processing device 3 and supplies information on compressed data contained in the received digital audio signal to the microcomputer 1. The process control unit 11 of the microcomputer 1 reads a plurality of header sections of information on audio format (audio) from among the data configuration illustrated in FIG. 2, and thereby acquires information on audio format encoded in the input signal. Also, the decoded audio signal is outputted to the surround processor 22 arranged at the subsequent stage. At this time, the decoded audio signal has the number of channels corresponding to the encoded audio.

The surround processor 22 applies based on control from the process control unit 11 of the microcomputer 1 a matrix processing (conversion into multi-channel) to the digital audio signal. The matrix processing system includes Pro Logic creating 5.1-channel from two-channel and NEO:6 (trademark) creating 6.1-channel; the surround processor 22 selects based on control from the process control unit 11, one from among Pro Logic processing and NEO:6 (trademark) processing and performs the matrix processing.

The signal processing device 3 is constituted of a predetermined processor device such as DSP, includes the decode processing unit 2, and applies the processing to a digital audio signal received from the outside and outputs the signal to a predetermined amplifier (not illustrated) or the like.

Figure 4:
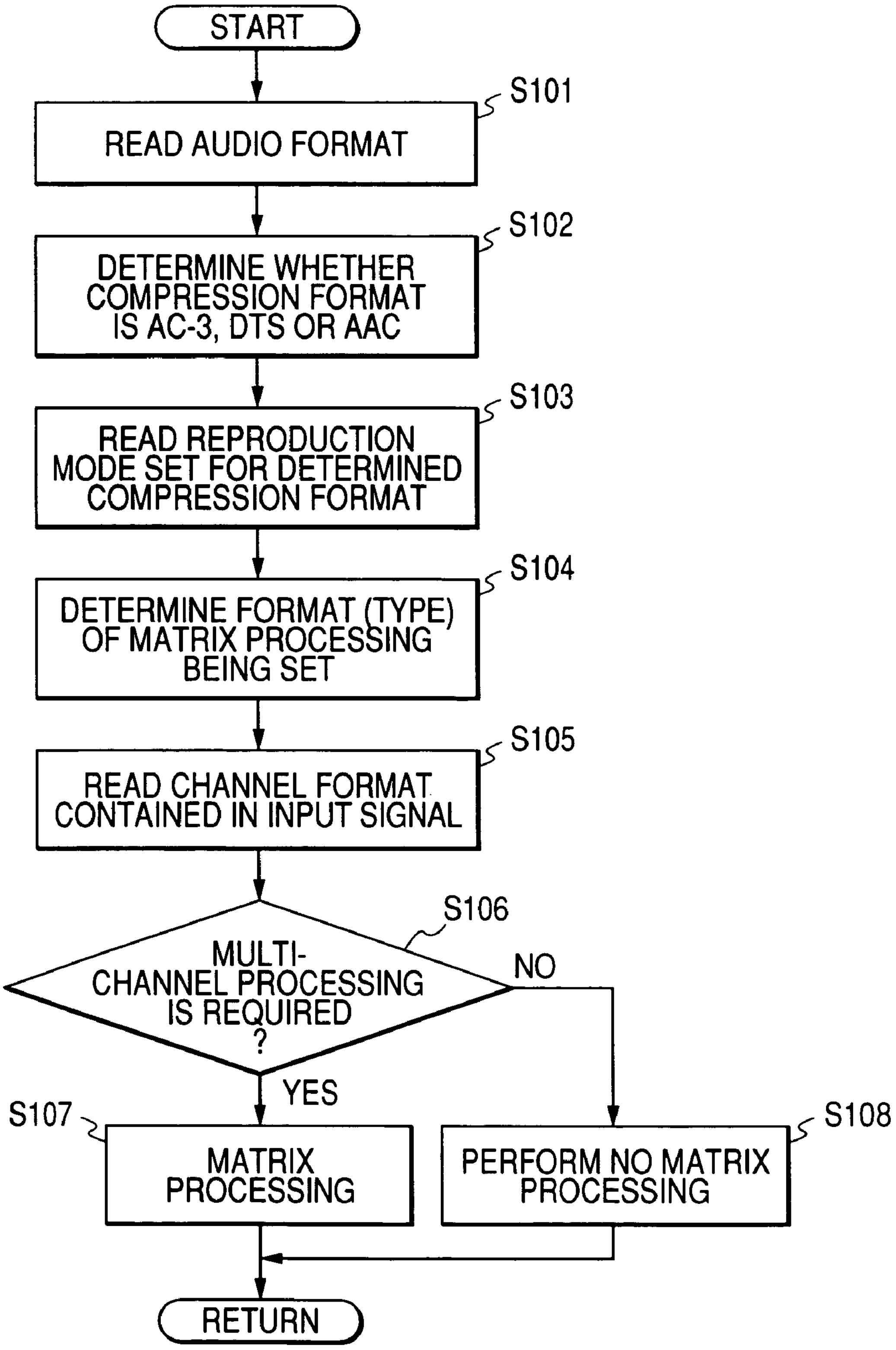
FIG. 4 is a flowchart for explaining the processing operation performed by the acoustic device of FIG. 1.

The reproduction mode setting processing performed by the acoustic device according to the present embodiment will now be described with reference to a flowchart of FIG. 4. The reproduction mode setting processing starts when the signal processing device 3 receives a digital audio signal (compressed audio signal) from the outside.

First, the process control unit 11 of the microcomputer 1 controls the decoder 21 to decode a digital audio signal and acquires information on data configuration thereof. The process control unit 11 reads from header information in a plurality of chunks, an audio format (compression format) contained in the digital audio signal (step S101).

The process control unit 11 of the microcomputer 1 determines whether the type of compression format of the digital audio signal is AC-3 (trademark), DTS (trademark) or AAC (trademark) (step S102) and then, accesses the storage unit 12 based on the determined compression format to read a setting of the corresponding reproduction mode (step S103).

The process control unit 11 determines based on the read setting of reproduction mode a matrix processing system (Pro Logic or NEO:6 (trademark)) for performing conversion into multi-channel (step S104).

The process control unit 11 of the microcomputer 1 reads from the information on data configuration of digital audio signal acquired in step S101, a channel format (how many channels have been used to encode the audio) encoded in the digital audio signal (step S105).

The process control unit 11 of the microcomputer 1 determines whether the read channel format requires a multi-channel processing by the surround processor 22 (step S106). More specifically, it is, determined whether or not the number of channels of the received audio signal is smaller than the number of channels obtained by the matrix processing being set and if it is determined that it is smaller (step S106: Yes), controls the surround processor 22 to perform a matrix processing (multi-channel processing) for performing conversion into multi-channel. Here, the matrix processing for the system determined in step S104 is performed (step S107). Meanwhile, when it is determined that the number of channels of the received audio signal is equal to or larger than the number of channels obtained by the matrix processing being set (step S106: No), it is determined that no matrix processing is required, and the process is finished while any matrix processing is performed (step S108).

According to the configuration and processing operation described above, the reproduction mode setting device according to the present embodiment is implemented. More specifically, according to the reproduction mode setting device of the present embodiment, a type of matrix processing and information on whether or not a matrix processing is to be performed are stored for each audio format and encode channel thereof, and based on the stored information, a processing is applied to an input signal.

Figure 5:
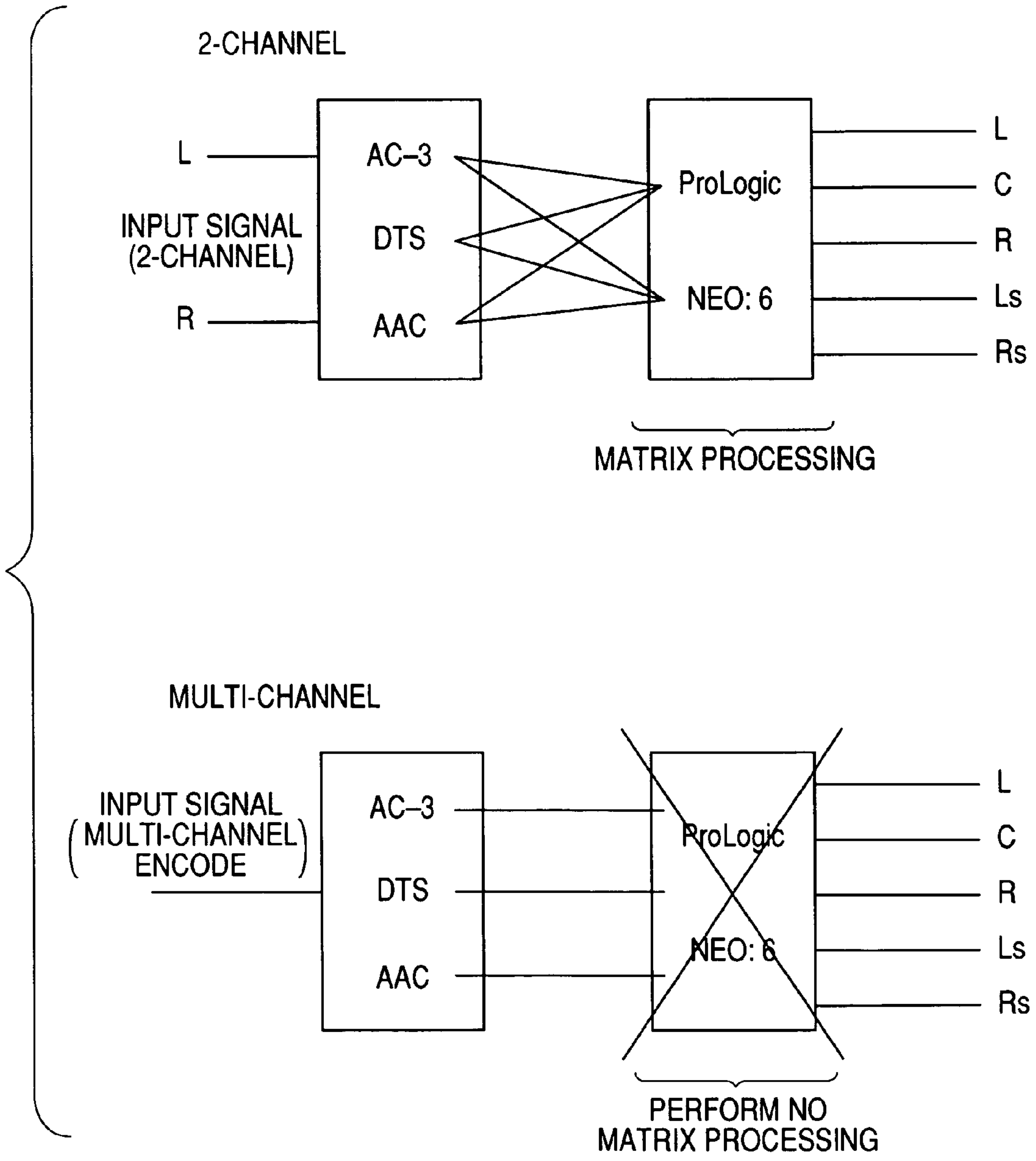
FIG. 5 is a schematic diagram for explaining the reproduction mode setting processing performed by the acoustic device of FIG. 1.

To be more in detail, as schematically illustrated in FIG. 5, when the digital audio signal is two-channel, a matrix processing set based on each compression format is performed; when the input signal is multi-channel, the signal is outputted while any matrix processing is performed. This can be implemented by the reproduction mode setting device according to the present embodiment having separately arranged therein the decoder 21 acquiring information on audio format contained in a digital audio signal and the surround processor 22 for performing a matrix processing. Also, it can be implemented that when the digital audio signal is multi-channel, a down-mix processing being set is performed and when the input signal is two-channel, the signal is outputted while any down-mix processing is performed.

Consequently, when the user performs switching between broadcastings of a different audio format or different encode channel and reproduction signals to watch them, there is no need to set a surround mode each time. As a result, TV watching can be performed in a comfortable manner without taking any notice of an audio format or the like of the TV broadcast to be watched.

Also, in a case where plural different compression audio (AC-3 (trademark), DTS (trademark) and the like) formats are received, reproduction mode is stored for each compression audio format, whereby the reproduction mode corresponding to each compression audio format is automatically set, and the user can enjoy reproduction with realistic sensation without performing any operation.

The present invention is not limited to the example shown in the above described embodiment, and many modifications to the embodiment and many applications are possible.

For example, in the above embodiment, descriptions are given with audio formats limited to three types; AC-3 (trademark), DTS (trademark) and AAC (trademark). However, another audio format such as PCM (trademark) or PEG-2 (trademark) may be used. Also, encode channel and the number of channels of matrix processing are not limited only to 2-channel, 5.1-channel and 6.1-channel shown in the above embodiment; for example, a configuration is possible which can handle 7.1-channel compatible with Dolby Pro Logic 2x (trademark) or the like.

Also, in the above embodiment, an example is described in which reproduction mode is set for TV broadcast. However, the reproduction mode setting device according to the present invention is not limited to TV broadcast sound. For example, in a reproduction apparatus for DVD software or the like, when the DVD audio format includes DTS (trademark) for Japanese voice and AC-3 (trademark) for English voice, voice switching can be smoothly performed by using the reproduction mode setting device according to the present invention.

It is also possible to reproduce a compressed audio and uncompressed audio in a mixed manner. For example, on CD, PCM audio signal is generally recorded by two-channel non-compression; the user selects a multi-channel processing A compatible therewith and stores it in the storage unit 12. Also, AC-3 (trademark) is usually recorded by 5.1-channel; the user selects a multi-channel processing B (for example, conversion processing etc. into 7.1-channel) compatible therewith and stores it in the storage unit 12. When an audio signal is received, an audio format is determined; when it is determined that the audio signal is PCM 2-channel, the multi-channel processing A compatible therewith is read from the storage unit 12 to set the multi-channel processing A for the surround processor 22. Meanwhile, when it is determined that the received audio signal has a compression format, more specifically, AC-3 (trademark) format, the multi-channel processing B compatible therewith is read from the storage unit 12 to set the multi-channel processing B for the surround processor 22. In this case, also, there can be provided an acoustic device capable of performing reproduction mode switching according to an input signal.

The invention claimed is:

1. An acoustic device which operates to receive an input of an audio signal contained information on an audio format and the number of audio channels and to set a reproduction mode for performing audio reproduction on the basis of the audio signal, the acoustic device comprising:

storage means for storing setting information for reproduction mode including information on a type of multi-channel processing for a plurality of audio formats in such a way of being able to update the setting information for each of the audio formats;

input reception means for receiving an input of the setting information for reproduction mode;

update means for updating setting information for reproduction mode stored in the storage means in accordance with the setting information for reproduction mode received by the input reception means;

audio information acquisition means for acquiring information on an audio format and the number of audio channels of an inputted audio signal from the inputted audio signal;

decision means responsive to the information on the audio format of the audio signal acquired by the audio information acquisition means for reading setting information of a reproduction mode for a corresponding audio format out of the storage means to decide the number of channels obtained based on information on a type of multi-channel processing contained in the read setting information; and reproduction mode setting means for setting a mode of a multi-channel processing for converting the audio signal into multi-channel with the number of channels decided by the decision means if the number of audio channels of the audio signal acquired by the audio information acquisition means is less than the number of channels decided by the decision means.

2. The acoustic device according to claim 1, wherein the audio signal is a compressed audio digital signal, wherein the audio information acquisition means includes decode means for decoding the audio digital signal to acquire the information on the audio format and the number of channels of the audio digital signal and to output audio data based on the audio digital signal, and wherein the reproduction mode setting means operates to set a mode of multi-channel processing for converting the audio data outputted from the decode means into multi-channel.

3. The acoustic device according to claim 1 or 2, further comprising multi-channel processing means for performing multi-channel processing with the mode set by the reproduction mode setting means to convert the audio signal into multi-channel, wherein the audio signal includes information on compression formats of the audio signal as the information on the audio format, wherein the storage means stores setting information of a reproduction mode for each of a plurality of compression formats, and wherein the decision means is based on the information on the compression formats of the information on the audio format acquired by the audio acquisition means to read setting information of a reproduction mode for a corresponding compression format out of the storage means and to decide the number of channels to be obtained by the set multi-channel processing on the basis of the setting of the multi-channel processing included in the setting information.

4. A signal processing method to be executed by a hardware processor, wherein the method performs receiving an input of an audio signal contained information on an audio format and the number of audio channels and setting a reproduction mode for performing audio reproduction on the basis of the audio signal, the method comprising the steps of:

storing setting information for reproduction mode including information on a type of multi-channel processing for a plurality of audio formats in such a way of being able to update the setting information for each of the audio formats;

receiving an input of the setting information for reproduction mode;

updating setting information for reproduction mode stored in the storage means in accordance with the setting information for reproduction mode received by the input reception means;

acquiring information on an audio format and the number of audio channels of an inputted audio signal from the inputted audio signal;

responding to the information on the audio format of the audio signal acquired by the audio information acquisition means for reading setting information of a reproduction mode for a corresponding audio format out of the storage means to decide the number of channels obtained based on information on a type of multi-channel processing contained in the read setting information; and setting a mode of a multi-channel processing for converting the audio signal into multi-channel with the number of channels decided by the decision means if the number of audio channels of the audio signal acquired by the audio information acquisition means is less than the number of channels decided by the decision means.

5. A non-transitory computer readable medium storing a computer program which causes a computer to execute a method for receiving an input of an audio signal contained information on an audio format and the number of audio channels and to set a reproduction mode for performing audio reproduction on the basis of the audio signal, the method comprising the steps of:

storing setting information for reproduction mode including information on a type of multi-channel processing for a plurality of audio formats in such a way of being able to update the setting information for each of the audio formats;

receiving an input of the setting information for reproduction mode; updating setting information for reproduction mode stored in the storage means in accordance with the setting information for reproduction mode received by the input reception means;

acquiring information on an audio format and the number of audio channels of an inputted audio signal from the inputted audio signal;

responding to the information on the audio format of the audio signal acquired by the audio information acquisition means for reading setting information of a reproduction mode for a corresponding audio format out of the storage means to decide the number of channels obtained based on information on a type of multi-channel processing contained in the read setting information; and setting a mode of a multi-channel processing for converting the audio signal into multi-channel with the number of channels decided by the decision means if the number of audio channels of the audio signal acquired by the audio information acquisition means is less than the number of channels decided by the decision means.

* * * * *